United States Patent Office 3,367,838
Patented Feb. 6, 1968

3,367,838
FISSIOCHEMICAL PROCESS FOR CARBON-NITROGEN BONDING
Roger I. Miller, Danville, Calif., assignor, by mesne assignments, to Aerojet-General Corporation, El Monte, Calif., a corporation of Ohio
No Drawing. Filed Sept. 29, 1964, Ser. No. 400,196
3 Claims. (Cl. 176—39)

The present invention relates in general to the economic formation of carbon-nitrogen compounds from inexpensive starting materials. There are herein employed fissiochemical reactions utilizing fission-fragment energy and providing substantially instantaneous quenching for direct reactions, thus eliminating the necessity of catalysts and multistep reactions.

The invention of this application is broadly directed to the insertion of nitrogen into organic chemistry by the production of reactions forming carbon-nitrogen bonds as well as reactions involving compounds containing carbon and nitrogen. In one aspect, the invention may be considered as applicable to the substitution of nitrogen for hydrogen in at least certain phases of organic chemistry.

The invention of this application is widely applicable in the field of organic chemistry for the production of compounds containing carbon-nitrogen bonds. The requisite energy for carrying out these endothermic reactions is herein supplied without the establishment of undesirably high reaction temperatures. Thus, for example, the present invention is applicable to the ammonolysis of organics, nitridation of organics, the nitration of organics, and nitrile formation. The majority of reaction products attainable in accordance with this invention are well known; however, they are conventionally produced in entirely different ways and often with great difficulty. The addition of functional groups to hydrocarbons, for example, is recognized to be advantageous and is practiced in the chemical arts. The present invention provides for accomplishing the foregoing, as well as other carbon-nitrogen reactions in an extremely simple and economical manner.

The synthesis of nitrogenous organic compounds has conventionally been relatively costly, as in the case of the synthesis of organic amines, imines, hydrazides, nitriles, and related nitrogeneous compounds which require multiple reaction processes and expensive starting materials. For example, one method commonly employed in the manufacture of amines includes the halogenation of a hydrocarbon to provide an organic halide followed by an ammonolysis of the halide. This usually produces a mixture of primary, secondary, and tertiary amines, as well as quaternary ammonium salts. The desired amine must then be separated from the mixture by fractional distillation techniques, or the like. As a further example, one common method employed in the manufacture of aromatic nitriles, such as benzonitrile, requires an aromatic sulfonate as one reactant material. The sulfonate may be prepared by reacting concentrated sulfuric acid with benzene or some other desired aromatic hydrocarbon at room temperature to first provide aromatic sulfonic acid. The desired sulfonate is then produced from the aromatic sulfonic acid by a substitution reaction, such as reacting the aromatic sulfonate with an organic cyanide at high temperature with a subsequent distillation of aromatic nitrile from the hot mixture. It will be appreciated that this manner of producing an aromatic nitrile, for example, has the disadvantages of a plurality of intermediate steps together with the necessity of employing relatively high cost starting materials, and yet provides only a limited yield of the desired end product.

The present invention overcomes conventional limitations and disadvantages in the synthesis of nitrogenous organic compounds by providing for the direct synthesis of the desired compounds from relatively inexpensive organic compounds and relatively inexpensive nitrogenous materials. In accordance with this invention, nitrogenous reactants may be chosen from such inexpensive materials as nitrogen and air or nitrogenous compounds available on an industrial scale, such as ammonia, hydrogen, cyanide, cyanogen, urea and the like. The particular organic reactant employed is determined by the desired resultant product and may be chosen, for example, from products of petroleum refining operations or those compounds manufactured in large tonnage at the present time for industrial synthesis processes such as, for example, methane, propane, ethylene, acetylene, butadiene, naphthalene, and various others.

The reactions desired to be carried out by the present invention are endothermic, in that energy must be added to the system. While the energy required for carrying out particular desired reactions may be calculated, it is often found that the direct application of such energy in the form of heat also serves to destroy the desired end products. This problem has been widely encountered in the chemical field and there have been advanced various approaches to the rapid reduction of system temperatures to freeze the end products. Substantially instantaneous quenching, i.e., temperature reduction, is quite difficult and does not always lend itself to the mass production of chemicals. Consequently, wholly alternative approaches to the production of various chemical compounds have been accepted by the industry, as noted above. The present invention does provide a substantially instantaneous quenching to the extent that the average reactant temperature may be maintained at almost any desired level and yet there is attained within the reaction volume adequate localized temperatures for carrying out the highly endothermic reactions.

The present invention utilizes the energy of fission fragments for the source of energy to accomplish carbon-nitrogen reactions. In the splitting of atomic nuclei there is produced a wide variety of products, including various types of radiation, both charged and uncharged, as well as two main fragments of the atomic nucleus. It is quite common in radiation chemistry to employ the rays and particles emanating from atomic fission events, however a great majority of energy release by such events appears as kinetic energy of nuclear fission fragments. Some two hundred million electron volts of energy are released by an atomic fission event and over 80% of this energy appears as kinetic energy of the fission fragments. Unfortunately, the range of fission fragments is quite small and in conventional atomic reactors the vast majority of fission fragments are contained within the mass of fissionable material. The present invention operates upon an entirely different basis than conventional radiochemistry in that the fissionable material which undergoes atom fission is herein provided in sufficiently finely divided form that the nuclear fragments separated by fission events do leave the particles of fissionable material to thereby traverse reactants within which the fissionable material is dispersed. By the utilization of an intimate admixture of finely-divided fissionable material and desired reactants, all of which are bombarded by thermal neutrons, there is produced atomic fission with the resultant nuclear fission fragments traversing the reactants to thereby release the energy thereof in extremely limited areas of the overall volume.

The release of fission-fragment energy in accordance with this invention produces extremely high effective temperatures along the fission-fragment paths in the reactants. Temperatures of the order of 10,000° Kelvin are attained and clearly this temperature is adequate to produce any endothermic reaction of interest in carbon-nitrogen chemistry. Although these extreme temperatures are available within the reaction volume to produce endothermic reactions, it will be appreciated that such temperatures are very highly localized. Consequently, it is possible in accordance with this invention to maintain almost any desired average reaction volume temperature well below temperatures which would be deleterious to products of the reaction. Because of the low average temperature, there is attained what may be considered a substantially instantaneous quench of reacted compounds so that high temperature reactions are herein carried out without the normal disadvantages thereof.

It will be appreciated that the yield of end products attainable with the present invention is necessarily quite limited in any closed reaction system, inasmuch as only a limited amount of energy release is possible while yet maintaining the reactants at a desired low temperature. Consequently, reactions in accordance with this invention are intended to be carried out continuously as by recycling reactants through a reaction volume. Suitable equipment for continuous processing in accordance with this invention may be quite conventional, and is thus not described in detail herein.

Further with regard to the present invention, there are set forth below various general reactions together with certain specific and detailed examples illustrative of the invention. In the following description, there are employed certain notations which for convenience are herein defined as follows:

f.f.=Fission fragments.
R=Radical.
G=Yield in number of molecules formed per 100 electron volts of energy deposited in the reactants.

It is further to be noted that in the following general notations, no attempt has been made to balance the equations but, instead, the reactions are defined in equation form for facility of identifying reaction products of primary interest. It will be appreciated that in each instance there may well be produced certain quantities of other organics as more specifically defined in the particular examples included herein.

Examples of general reactions in accordance with the present invention include the following:

(1)
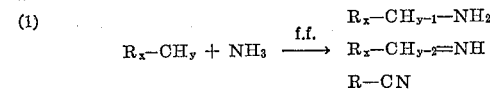

Where $x=0, 1, 2$ or 3 organic radicals,
$y=4, 3, 2$ or 1 hydrogen, and
$x+y=4$ (2)
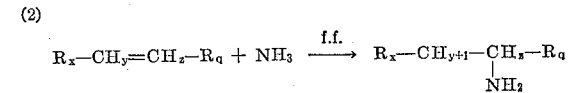

Where $x$ and $q$ may be 0, 1 or 2 organic radicals,
$y$ and $z$ can be 2, 1 or 0 hydrogens, and
$x+y=2, z+q=2$ (3)
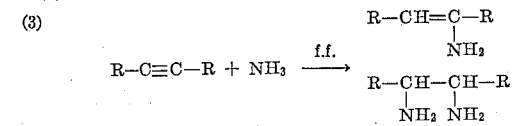

Where R can be H or an organic radical (4)
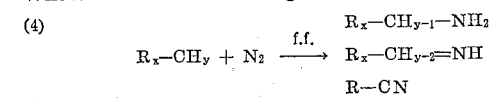

Where $x=0, 1, 2$ or 3
$y=4, 3, 2$ or 1
and $x+y=4$ (5)
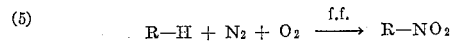

(6)
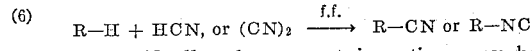

More specifically, the present invention may be employed, for example, for the direct production of alkyl amines from a mixture of unsubstituted alkane hydrocarbons and ammonia. Fission-fragment irradiation of a mixture of methane and ammonia results in the production of methylamine as generally indicated by the relationship

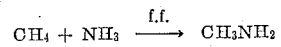

A number of different "irradiations" were performed to determine the yield of methylamine and other nitrogenous organics by fission-fragment radiolysis.

EXAMPLE I

A small stainless steel capsule having a volume of 30 cubic centimeters was loaded with methane at 111 p.s.i.g. and ammonia at 114 p.s.i.g., and contained 1.85 grams of $U^{235}$. The fissionable material was provided in the form of an open mass of fine glass wool containing $U_3O_8$ incorporated as a solid solution in a matrix of silica. The individual fibers were smaller than five microns in diameter so that fission fragments could escape therefrom to traverse the surrounding reactants. This capsule was formed as a primary vessel designed to withstand pressures of the order of 2650 p.s.i.a. and was surrounded by a container adapted to carry a cooling gas such as nitrogen for controlling temperature of the primary vessel containing the reactants and fissionable material. Average temperature of the reactants was maintained at about 100° C. There was thus provided within the capsule about 0.2 gram of methane and about the same amount of ammonia so as to achieve an equal molar relationship. This capsule was irradiated for 7.7 hours in a 20-watt reactor (AGN–201) with a calculated energy disposition in the gas mixture of $8 \times 10^{20}$ electron volts. Following this irradiation the capsule was removed from the reactor and the gas mixture in the capsule was analyzed. It was determined that methylamine was present and that a yield of about $G=1.3$ was attained.

EXAMPLE II

A capsule, as in Example I, was loaded with 100 p.s.i.g. methane, 111 p.s.i.g. ammonia, and substantially the same amount of $U^{235}$ as above. Irradiation for 7.5 hours in the same reactor, to cause a calculated deposit of $7.5 \times 10^{20}$ electron volts of energy in the gas, produced measured chemical yields as follows:

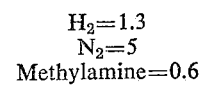

The large yield of $N_2$ suggests contamination during capsule loading; however, this example clearly substantiates the production of methylamine in accordance with the invention.

EXAMPLE III

A capsule was loaded with 0.19 gram of methane (780 p.s.i.a.), 0.034 gram of ammonia (128 p.s.i.g.) and 0.002 gram of $U^{235}$ as a solid solution of $U_3O_8$ in fine glass fibers. The capsule was subjected to one hour irradiation with thermal neutrons in a reactor core to produce a calculated energy deposition of $2.1 \times 10^{23}$ electron volts. Although it was originally calculated that the gas phase mixture consisted of methane and ammonia in about six-to-one ratio, further considerations of the actual situation resulted in a determination that the molar ratio was about four-to-one. Analysis of the contents following the example identified the following product in the indicated yield: methane=0.4; propane=0.08; and methylamine=0.002. It was determined that some helium had been inadvertently added to the system, and this may have contributed to the low yield.

In each of the foregoing examples, it is clear from the resultant analysis that methylamine was produced. No attempts were made in these examples to maximize yield, but instead, the processes were carried out to verify the production of methylamine from methane and ammonia subjected to fission fragments passing through the mixture. It is to be further noted that the provision of an excess amount of organic reactant tends to decrease the resultant yield and, consequently, the invention will be seen to best proceed with an overabundance of the nitrogenous reactant.

Mixtures of either mono-, di-, or tri-substituted alkyl hydrocarbons and ammonia similarly produce amines upon fission fragment irradiation and in some instances nitriles are also produced. In accordance with the present invention, the following reactions may be carried out:

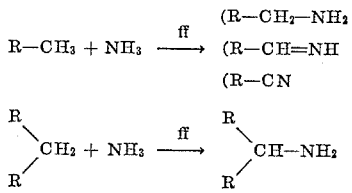

The present invention is applicable in the direct reaction of both substituted and unsubstituted alkanes with ammonia to produce amines. $CH_4$ and $NH_3$ may be combined directly in accordance with this invention through the utilization of fission-fragment energy to produce $CH_3NH_2$. In addition to the above-identified examples of the present invention, positive results have also been obtained in other specific instances of liquid phase and gas phase reactions. Thus, benzene and ammonia have been directly combined in both liquid phase and gas phase with measurable yield of carbon-nitrogen compounds.

EXAMPLE IV

A small stainless steel capsule was loaded with eighteen grams of benzene and 3.9 grams of ammonia with 1.5 grams of $U^{235}$ in the form of thin glass fibers containing uranium oxide as fuel. This capsule was irradiated for eight hours in a 20-watt reactor (AGN-201) to determine reaction products in the mixture of liquids in equimolar concentration. Analysis of the capsule contents following the foregoing irradiation produced the following measured values of yield: $H_2$=0.81; $N_2$=not measured; methane=0.001; ethane=0.002; diphenyl=0.01; aniline=0.01. Certain other products in smaller yields were tenatively identified as n-hexane, cyclohexane, and possibly acetylene and hydrazine. The concentration of aniline ($C_6H_5NH_2$) was determined not only by infrared spectrophotometry, but also by gas chromatography and both of these methods of analysis showed the aniline concentration to be about 300 to 400 parts per million in liquid phase at room temperature.

EXAMPLE V

An additional irradiation of benzene and ammonia was carried out in a higher power reactor than that employed in the Example IV, i.e., the GETR reactor in Vallecitos. This capsule was loaded with 0.6 gram benzene, 0.5 gram ammonia and 0.002 gram $U^{235}$ in the form of fiber glass fuel. This fuel was constituted as in previous examples by extremely fine fiber glass fibers including $U_3O_8$ therein and provided in an open mass to thereby substantially fill the capsule and uniformly disperse the fissionable material therethrough. This irradiation constituted a gas phase operation in which the molar ratio of benzene to ammonia was approximately one-to-four. The capsule was irradiated for one hour and energy deposition, calculated from a knowledge of the neutron flux, fuel loading and irradiation time, showed a maximum energy deposition of $1.2 \times 10^{23}$ electron volts in the reactant. Following the irradiation, the capsule contents were carefully analyzed with the results that there were identified the following products in the stated yields:

| | |
|---|---|
| $H_2$ | 0.67 |
| $N_2$ | 0.13 |
| Methane | 0.1 |
| Ethane | 0.03 |
| n-Butane | 0.15 |
| Cyclohexane | 0.01 |
| Aniline | 0.12 |
| Diphenyl | 0.25 |
| Hydrazine | 0.15 |

It is quite clear from the foregoing examples that fission-fragment irradiation of benzene and ammonia does produce carbon-nitrogen compounds and in particular, aniline. Similar irradiation of benzene and ammonia without the presence of finely-divided $U^{235}$ in the reactants fails to produce any measurable amount of carbon-nitrogen compound, and this is to be expected inasmuch as insufficient energy deposition would result from the reactor itself to produce the desired reactions. This then further substantiates the operability and advantages of the present invention.

In the foregoing description of the present invention, no attempt has been made to set forth examples of process operation upon all possible materials, for it is to be appreciated that a very wide variety of organic materials and nitrogenous materials may be employed. Emphasis has been placed herein upon the utilization of inexpensive and readily available reactants; however, the invention is equally applicable with alternative reactants from those specifically identified herein.

There is produced in accordance with the present invention, a direct reaction between organic compounds and nitrogenous materials without the necessity of employing catalysts or undesirably high temperatures or pressures during the reaction. As previously stated, the process of the present invention is intrinsically limited in the yield of end products that can be feasibly produced in one irradiation, and it is intended insofar as commercial application of this invention is concerned, that re-cycling of reactants will be employed. In order to maintain the over-all temperature of the reaction volume and contents at a reasonable level, it is, of course, necessary to limit the amount of energy release by fission events in order not to unduly raise this average temperature. There is yet attained in accordance with the present invention, extremely high reaction temperatures along the paths of fission fragments traversing the intimately admixed reactants. This energy is available for and is utilized to disrupt existing chemical bonds between components of the starting materials so as to provide for the direct interaction of chemicals which are not otherwise reactive at the average temperatures employed herein.

With regard to the separation of reaction products produced by the present invention, it will be appreciated that various separate schemes are possible, as dictated by the individual products to be removed from the system. It has been found that separation of reaction products produced by this invention does not pose a serious problem to carrying out the invention on a commercial scale; however, inasmuch as separation of the products forms no part of this invention, there is not included herein a discussion of various alternative separation systems.

The present invention does provide a highly economical process for the production of carbon-nitrogen compounds highly useful in industry and heretofore formed from different starting materials, in entirely different ways, and with considerably more difficulty. It is not intended to limit the present invention by the terms of the foregoing description, for it is believed clear that a wide variety of alternatives are possible in carrying out the process of this invention. Reference is made to the appended claims for a precise delineation of the true scope of this invention.

What is claimed is:

1. A process of substituting nitrogen for hydrogen in organic compounds comprising the steps of intimately mixing a fluid organic reactant of benzene with a fluid nitrogenous reactant of ammonia, passing the mixture through a reaction zone, producing a nuclear fission in said zone with a release of fission fragments to traverse the mixture for establishing localized high temperatures in the mixture along fission fragment paths therein, cooling the reaction zone to maintain a steady low temperature therein, removing reaction products including aniline from the mixture outside the reaction zone, and recirculating the unreacted reactants through the reaction zone.

2. A process of substituting nitrogen for hydrogen in organic compounds comprising the steps of intimately mixing a fluid organic reactant of methane with a fluid nitrogenous reactant of ammonia in a greater molar concentration than that of methane, passing the mixture through a reaction zone, producing a nuclear fission in said zone with a release of fission fragments to traverse the mixture for establishing a localized high temperature in the mixture along fission-fragment paths therein, cooling the reaction zone to maintain a steady low temperature therein, removing reaction products including methylamine from the mixture outside the reaction zone, and recirculating the unreacted reactants through the reaction zone.

3. A process as set forth in claim 2 wherein said organic and nitrogenous reactants are gases.

References Cited

UNITED STATES PATENTS

| | | | |
|---|---|---|---|
| 2,928,780 | 3/1960 | Harteck | 204—154 X |
| 2,952,597 | 9/1960 | Cleaver et al. | 204—154 |
| 3,030,288 | 4/1962 | Stoops | 204—154 X |
| 3,065,159 | 11/1962 | Connor et al. | |
| 3,228,848 | 1/1966 | Fellows | 176—39 |
| 3,250,683 | 5/1966 | Gustavson et al. | 176—39 |

OTHER REFERENCES

Nucleonics, February 1961, pp. 48–51.

REUBEN EPSTEIN, *Primary Examiner.*

UNITED STATES PATENT OFFICE
CERTIFICATE OF CORRECTION

Patent No. 3,367,838                          February 6, 1968

Roger I. Miller

It is certified that error appears in the above identified patent and that said Letters Patent are hereby corrected as shown below:

In the heading to the printed specification, lines 4 to 6, "assignor, by mesne assignments, to Aerojet-General Corporation, El Monte, Calif., a corporation of Ohio" should read -- assignor to The General Tire & Rubber Company, Akron, Ohio, a corporation of Ohio --.

Signed and sealed this 21st day of October 1969.

(SEAL)
Attest:

Edward M. Fletcher, Jr.                      WILLIAM E. SCHUYLER, JR.

Attesting Officer                             Commissioner of Patents